May 7, 1946.   W. R. LINDEN   2,399,646
HEATED BACKING-UP STRIP FOR SHEET METAL WELDING
Filed Oct. 23, 1943
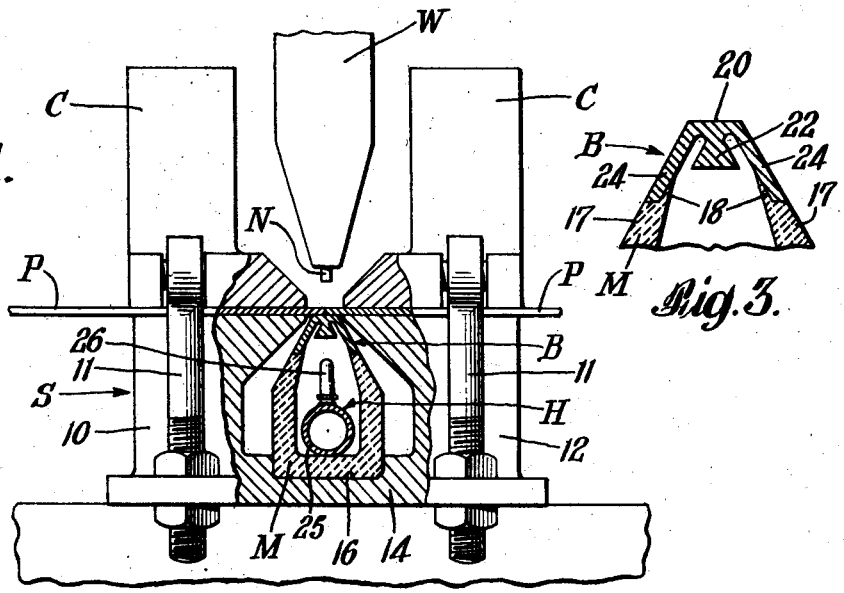
Fig. 1.
Fig. 3.
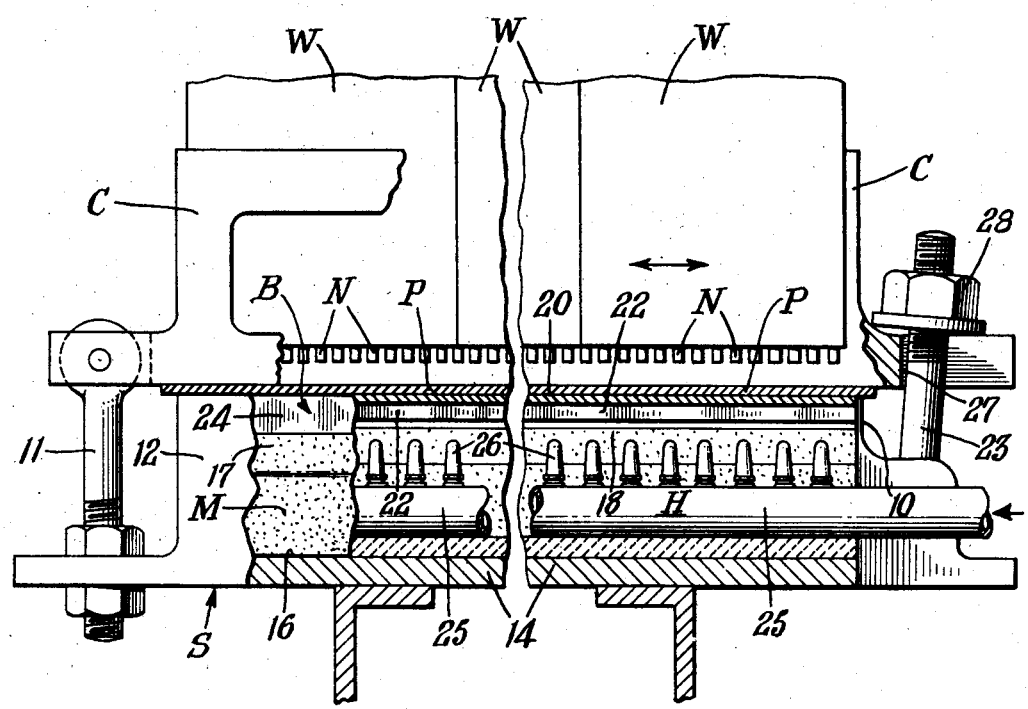
Fig. 2.
INVENTOR
WALTER R. LINDEN
BY
ATTORNEY

UNITED STATES PATENT OFFICE 2,399,646

HEATED BACKING-UP STRIP FOR SHEET METAL WELDING

Walter R. Linden, Palisades Park, N. J., assignor to The Linde Air Products Company, a corporation of Ohio Application October 23, 1943, Serial No. 507,418

8 Claims. (Cl. 113—111)

In the welding of sheet metal, the relative thickness of the stock and the high temperatures involved in the welding tend to cause sagging of the metal adjacent the joint. Also, when the welding is progressive, the metal ahead of the welding zone is cold, and is subjected to rapid heating in the welding zone, while the metal following the welding zone is necessarily subjected to cooling effect of the ambient air. These differences in temperature and consequent differences in expansion result in other distortion of the metal adjacent the joint. Hence it is desirable to provide some means of backing up the weld to prevent such distortion. However, a backing member capable of withstanding the temperatures, such as a metal bar, conducts the heat away so rapidly as to cause chilling of the metal at the joint, which interferes with the welding operation to such an extent as to prevent the production of a satisfactory weld.

It is therefore the main object of the present invention to provide a heated backing-up bar for sheet metal welding, to prevent rapid heat conduction away from the weld. In other words, this purpose is to keep the backing-up bar hot enough so that it will not rob the heat out of the weld.

With the foregoing object in view, the invention comprises a backing-up strip constructed of non-corroding material. A series of burners or a single burner as a source of heat, such as an air-gas burner or some other suitable means such as an electric resistance unit, is employed to maintain the backing-up strip at a constant temperature. The backing-up strip is provided with fins or flanges to prevent warping thereof, and extends the entire length of the metal sheets directly under the welding zone. The members to be welded, which may be metallic plates or strip material, are placed on the backing member with the edges to be joined in juxtaposed or substantially abutting relation, and in alignment with the backing member and held firmly in position by suitable clamping means. The air-gas burner or other heating means is located below the backing-up member for heating the same, preferably vertically aligned with the abutting edges of the strips or plates to be welded.

When the workpieces have been thus supported and fixed in position, and the air-gas burner ignited or the electric heater energized to heat the backing member to a constant temperature, the welding operation is started.

The welding operation may be either electrical or oxy-fuel as desired. In a preferred method of oxy-fuel welding, a series of oxy-fuel gas heating flames is impinged simultaneously upon the meeting edges of the members throughout substantially the entire length of the meeting edges, and this series of flames is oscillated or reciprocated longitudinally of the edges until the metal of the juxtaposed edges fuses and commingles. When this occurs the heating flames are withdrawn so that only the outer envelopes of the flames contact the work, and so maintained until the fused metal solidifies in order to maintain a reducing atmosphere adjacent the weld metal.

As an example of an electric method of welding, an electrode is brought into position adjacent the juxtaposed edges at one end of the same, an arc is struck and maintained while the electrode is progressed along the same. The electric welding operation is improved by feeding an infusible granular refractory mineral welding material adjacent the electrode to cover the electrode and the weld and protect the same from oxidation. The granular fusible refractory mineral welding material fuses in the welding zone and covers the weld. As it cools this material solidifies and generally cracks and disintegrates so that it may be readily removed as soon as the completed weld has cooled.

When the welded joint has completely solidified the heating flames are extinguished or the electric current discontinued as the case may be, and the clamping means are released thereby completing the operation.

In the accompanying drawing

Fig. 1 is an end view of welding apparatus, parts being broken away and shown in section to disclose the heated backing bar according to the present invention, with the refractory support and heating means therefor;

Fig. 2 is a side elevation of the structure shown in Fig. 1, with parts similarly broken away to show the internal construction of the same parts; and, Fig. 3 is an enlarged detail of the backing bar and refractory support shown in Fig. 1.

The form of apparatus illustrated in the drawing comprises a work-supporting means S, on which the plates or workpieces P are held in proper relation by means of movable substantially parallel clamps C. A backing bar B is disposed on a refractory mounting M located on the support S beneath and in longitudinal alignment with the juxtaposed edges of the plates or workpieces P and substantially parallel to the clamps C.

Suitably supported above the workpiece P and their support S, and depending between the clamps C is a welding head W for supplying welding heat to the juxtaposed edges of the workpieces P. While this head W may be an electric welding head provided with a suitable electrode, it is shown as a suitable oxy-fuel gas heating unit, provided with a series of closely spaced nozzles N disposed in longitudinal alignment with the line of intersection of the workpieces P. A mixture of combustible gas, such as acetylene, and a combustion supporting gas, such as oxygen, is supplied to the head H and distributed to the nozzles N to supply the welding flames. This unit is mounted for vertical displacement and adjustment and horizontal reciprocation or oscillation.

For maintaining the backing-up bar B at a constant or uniform temperature, and preventing it from too rapidly conducting heat away from the weld, suitable heating means H is mounted below the backing bar B, in position to supply the heat along a line aligned with the line of weld. The heating means H may be an electrical resistance unit, but it is shown as an air-gas burner centrally mounted within the mounting M, and directing its flames upwardly against the underside of the backing-up bar B.

Referring more particularly to the drawing, the support S comprises two upstanding pedestal portions 10 and 12, connected or spaced by a web or spacer 14. The tops of the pedestals 10 extend inwardly, to support a larger area of the workpiece P.

The web or spacer 14 is formed with a groove 16 of rectangular cross section to receive the refractory mounting M, of brick, fireclay, or other suitable ceramic material, although metals of sufficient heat resistance may be used. In the form shown the mounting M is of channel-shaped cross section, with its flanges 17 converging toward its open top. Resting on the mounting is the backing bar B, the dimensions of which are predetermined in accordance with the thickness of the workpieces P.

The upper surfaces of the pedestal portions 10 and 12 are at the same horizontal level and the workpieces P are supported upon these sections with their opposed edges in abutting or substantially abutting relation, and centrally above the top surface 20 of the bar B.

The backing bar B is shown in detail in Fig. 3. This member is constructed of non-corroding material, such as copper, copper alloy, stainless steel, and carbon or graphite block. The bar B comprises a top portion 20 having an upper surface adapted to underlie the juxtaposed edges of the workpieces P. The bar B also comprises a depending central portion 22, the sides of which diverge downwardly to afford sufficient mass to accumulate a considerable quantity of heat. The under surface of the portion 22 is substantially parallel to the top surface 20 and consequently normal to ascending heat so as to facilitate accumulation thereto.

The bar B also has depending side flanges 24, to prevent warping of the bar. These flanges extend below the central portion 22, to increase the radius of gyration of the beam effect of the bar, and preferably diverge parallel to the sides of the central portion 22 and therefore equally spaced therefrom. This upwardly converging relation of the flanges 24 and the sides of the central portion 22 serves to concentrate the accumulated heat centrally of the bar and therefore toward alignment with the juxtaposed edges of the workpieces P and the line of welding thereof.

The flanges 17 of the mounting M are provided with portions interfitting or mating with the flanges 17 of the bar B, to insure longitudinal alignment thereof, and to secure the bar in position on the mounting M. As shown in Fig. 3, the flanges 17 have upwardly extending inner ridges 18, forming ledges on which the bottoms of the flanges 24 rest, secured against lateral displacement. Of course, suitable pin or dowel means may be used for this purpose, entering corresponding holes in the opposite member, the holes preferably being elongated to provide for expansion.

The heater H, which as hereinbefore stated may be an electric resistance heating unit, and as such mounted between the flanges 24 and contacting the lower surface of the central portion 22 of the bar B, is shown in Figs. 1 and 2 as an air-gas burner. This burner comprises a casing 25, preferably a perforated pipe having a longitudinal row of perforations each provided with a burner tip 26. The casing 25 is supplied with a combustible gas, such as water gas or other hydrocarbon or mixture, the ends of the mounting M being left open for access of air to support combustion of the gas issuing from the tips 26. The row of burner tips is aligned with the vertical center line of the bar B, and therefore aligned with the line of weld.

The clamps C for holding the work firmly in correct relation, are pivotally connected to the pedestals 10 and 12 of support S in such a manner that they may be swung both vertically and laterally away from the support and also adjusted a slight distance laterally with respect to the line to be welded. These clamps extend inwardly as shown in Fig. 1, for substantially the same distance that the upper portions of the pedestals 10 and 12 extend inwardly, to supporting a larger area of the work pieces P.

Each clamp C is pivotally connected at one end to a bolt 11 rotatably and vertically adjustably secured to one of the pedestals 10 and 12. The pivotal connection of the clamp to the bolt permits limited lateral movement of the clamp along the pivot, as may be seen by reference to Fig. 1. At its opposite end each clamp is slotted as at 27 to receive a bolt 23, swingably connected to the support S, and provided with suitable clamping means 28, which may be a washer and nut. By vertical adjustment of the bolts 11 on support S, and adjustment of clamping means 28, the clamps C may be urged into firm engagement with the work.

The welding unit when an oxy-gas welding operation is employed, includes the series of multi-flame heating heads W of which a sufficient number are provided in tandem so that the series of nozzles N thereof are substantially coextensive with the line to be welded. The welding unit may be moved vertically into and out of operative relation with the work, and this movement is preferably automatically controlled.

As the heating nozzles N of the heads H are necessarily spaced a slight distance apart, it is desirable to reciprocate the heads longitudinally of the line to be welded, for a sufficient distance to insure the direct application of heat to the entire seam, a distance of the order of the spacing between the heater flames.

In operation, the heating unit H is first started, by energizing the electrical resistance unit, or by igniting the burners 26, combustible gas being supplied to the casing 25, and thereby distributed to and issuing out through the burners 26. The heat thus supplied is rapidly transferred to the bar B, maintaining it at a uniform temperature throughout the welding operation, or successive welding operations, sufficient to prevent heat conductivity therethrough away from the weld, in an amount sufficient to chill the same.

The plates or workpieces P are placed on the support S with their adjacent edges in substantially abutting relation to form a line to be welded. The plates are so placed that the line to be welded is centered over the central depending portion 22 of the heating backing bar B, and accordingly centered over the row of flames of the air-gas heating burner H, or the center line of an electrical resistance unit, as the case may be. The clamps C are then secured in properly spaced position to hold the work in place. Prior to the above operations, the ends of the welding electrode, or the nozzles N, will have been spaced at the proper distance from the backing bar. When gas welding is employed, the amount of oscillation of the heads H is dependent upon the spacing of the nozzles N. With the gas welding unit in its upper position, the gas and oxygen control valves are opened and the heating flames ignited and adjusted to the proper proportions. In most applications, the flames are adjusted to be neutral by having substantially equal volumes of a combustion supporting gas, such as oxygen, and a combustible gas, such as acetylene, supplied to the nozzles N.

The welding head W is then lowered in operative relation to the work. At the same time, the flames thereof are reciprocated longitudinally of the line to be welded. The welding flames, by reason of the reciprocatory movement, are impinged against substantially all portions of the edges of the workpiece P.

After a definite time interval, the edges of the work become fused and commingle. At this time the flames are withdrawn from the work so that only the outer envelopes of the flame contact the work. The flames are maintained ignited until the fused material solidifies, thus insuring that the outer envelope gas from the flames will form a reduced atmosphere over the fused metal. On heavier work, a carburizing flame may be used at this stage to obtain a better appearing weld.

During the welding operation, the backing bar B, as heated by the heating means H, prevents heat conductivity away from the weld, while supporting the workpiece edges against sagging or other distortion. When the fused metal has solidified, the welding flames are extinguished, or the welding electrode deenergized, and the clamps are released, completing the welding operation.

What is claimed is:

1. A backing member for preventing distortion of material adjacent a seam being welded, said backing member comprising a top portion conforming to the underside of the material being welded, a central portion depending therefrom underlying said seam and increasing in width toward the bottom, and depending side flanges spaced from and parallel to the downwardly diverging sides of said central portion to prevent warping of said backing member, the portion of the space between said depending side flanges adjacent each side flange being unobstructed, leaving a clear passage for heated gases.

2. A backing member for preventing distortion of material adjacent a seam being welded, said backing member comprising a top portion conforming to the underside of the material being welded, a central portion depending therefrom underlying said seam and increasing in width toward the bottom to provide a substantial mass to retain a substantial quantity of heat, and side flanges parallel to the downwardly diverging sides of said central portion and depending below the bottom of said central portion to prevent warping of said backing member, said depending diverging side flanges being spaced from said central portion, and the spaces therebetween being unobstructed to leave a clear passage for hot gases.

3. A backing member for preventing distortion of material adjacent a seam being welded, said backing member comprising a top portion conforming to the underside of the material being welded, and a central portion depending therefrom underlying said seam, the bottom of said central portion being of greater thickness than the top thereof, and depending diverging side flanges parallel to the sides of said central portion and terminating in downwardly directed edges, in combination with flame producing heating means disposed below said central portion between said edges and aligned with said seam and projecting flames into the space between said central portion and said diverging depending side flanges, to converge the gases from said flames for maintaining said backing member at a constant temperature.

4. A backing member for preventing distortion of material adjacent a seam being welded, said backing member comprising a top portion conforming to the underside of the material being welded, and a central portion depending therefrom underlying said seam and increasing in width toward the bottom, in combination with gas fired heating means disposed below the bottom of said depending central portion and projecting heating flames thereagainst for maintaining said backing member at a constant temperature.

5. A backing member for preventing distortion of material adjacent a seam being welded, said backing member comprising a top portion conforming to the underside of the material being welded, a central portion depending therefrom underlying said seam, and side flanges depending from said top portion parallel to but spaced from said central portion, in combination with gas fired flame producing heating means disposed below said central portion and between said side flanges for projecting heat against the underside of said central portion.

6. A backing member for preventing distortion of material adjacent a seam being welded, said backing member comprising a top portion conforming to the underside of the metal being welded, a central portion depending therefrom underlying said seam and being of substantial mass to retain a quantity of heat, and depending side flanges parallel to said central portion, the outer sides of said central portion and the inner sides of said flanges diverging away from said seam; in combination with an air-gas burner disposed below said central portion and having a row of flames aligned with said seam whereby gases therefrom are converged toward said seam for maintaining said backing member at a constant temperature.

7. A backing member for preventing distortion of material adjacent a seam being welded, said backing member comprising a top portion conforming to the underside of the material being welded; in combination with a refractory mounting for said backing member, and gas fired flame producing heating means within said refractory mounting and projecting flames out from said refractory mounting to engage said backing member for maintaining said backing member at a constant temperature.

8. A backing member for preventing distortion of material adjacent a seam being welded, said backing member comprising a top portion conforming to the underside of the material being welded, and side flanges depending therefrom; in combination with a refractory mounting for said backing member having upstanding flanges registering with said depending flanges, interfitting means on the registering flanges of said mounting and member for maintaining longitudinal alignment thereof, and heating means within said mounting for maintaining said backing member at a constant temperature.

WALTER R. LINDEN.